United States Patent
Fujiwara et al.

(10) Patent No.: US 12,454,970 B2
(45) Date of Patent: Oct. 28, 2025

(54) JOINT STRUCTURE

(71) Applicant: Panasonic Intellectual Property Management Co., Ltd., Osaka (JP)

(72) Inventors: Junji Fujiwara, Osaka (JP); Atsuhiro Kawamoto, Hyogo (JP); Hitoshi Nishimura, Osaka (JP); Yasushi Mukai, Osaka (JP); Shigeki Yonemori, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 509 days.

(21) Appl. No.: 16/087,145

(22) PCT Filed: Mar. 24, 2017

(86) PCT No.: PCT/JP2017/011976
§ 371 (c)(1),
(2) Date: Sep. 21, 2018

(87) PCT Pub. No.: WO2017/170213
PCT Pub. Date: Oct. 5, 2017

(65) Prior Publication Data
US 2019/0101145 A1  Apr. 4, 2019

(30) Foreign Application Priority Data

Mar. 30, 2016 (JP) .................................. 2016-067198
Apr. 8, 2016 (JP) .................................. 2016-077848

(51) Int. Cl.
*F16B 5/08* (2006.01)
*B23K 9/02* (2006.01)
(Continued)

(52) U.S. Cl.
CPC ............. *F16B 5/08* (2013.01); *B23K 9/02* (2013.01); *B23K 9/167* (2013.01); *B23K 9/173* (2013.01); *B23K 9/232* (2013.01); *B23K 2103/18* (2018.08)

(58) Field of Classification Search
CPC ...... B23K 9/02; B23K 9/232; B23K 2103/18; B23K 2101/006; B23K 2103/04;
(Continued)

(56) References Cited

U.S. PATENT DOCUMENTS 3,095,951 A * 7/1963 Rood .................... B23K 9/007
219/94
3,256,669 A * 6/1966 Seiwert ................. B21D 49/00
52/630
(Continued)

FOREIGN PATENT DOCUMENTS

CN         102513678 A * 6/2012
DE   10 2010 044 886        5/2011
(Continued)

OTHER PUBLICATIONS https://web.archive.org/web/20160204194619/https://en.wikipedia.org/wiki/Polyethylene_terephthalate (Year: 2016).*
(Continued)

*Primary Examiner* — Steven W Crabb
*Assistant Examiner* — Fahmida Ferdousi
(74) *Attorney, Agent, or Firm* — Wenderoth, Lind & Ponack, L.L.P.

(57) ABSTRACT

A joint structure includes a first metallic material having a first projection, a second metallic material similar to and weldable to the first metallic material, and a different material having a first penetrating part and sandwiched between the first and second metallic materials, the different material being difficult to weld to the first and second metallic
(Continued)

materials. The first projection is smaller than the first penetrating part and is spaced from the rim of the first penetrating part. The first projection is positioned in the first penetrating part and spaced from the second metallic material by a gap. The gap has a size of a predetermined percentage of the thickness of the first projection to which arc welding is applied. The first and second metallic materials are melted and joined together inside the first penetrating part to compress and fix the different material, so all three are fixed together.

10 Claims, 14 Drawing Sheets

(51) Int. Cl.
  *B23K 9/167* (2006.01)
  *B23K 9/173* (2006.01)
  *B23K 9/23* (2006.01)
  *B23K 103/18* (2006.01)

(58) Field of Classification Search
  CPC .............. B23K 2103/05; B23K 2103/10; B23K 9/007; B23K 11/16; B23K 9/00; F16B 5/08; B29C 66/41
  See application file for complete search history.

(56) References Cited

U.S. PATENT DOCUMENTS

| | | | | |
|---|---|---|---|---|
| 4,559,274 A * | 12/1985 | Kloppe | ............... | B29C 44/1266 428/594 |
| 4,791,765 A * | 12/1988 | Noggle | ............... | B32B 3/00 428/614 |
| 9,676,421 B2 * | 6/2017 | Yamada | ............... | B62D 25/08 |
| 2009/0188206 A1 | 7/2009 | Stol et al. | | |
| 2009/0278371 A1 * | 11/2009 | Fuchs | ............... | B29C 66/742 296/29 |
| 2012/0012239 A1 * | 1/2012 | Fuchs | ............... | F16B 11/006 156/60 |
| 2014/0034215 A1 * | 2/2014 | Khan | ............... | B23K 20/1265 228/2.1 |
| 2016/0123362 A1 | 5/2016 | Iwase | | |
| 2016/0325488 A1 * | 11/2016 | Tanaka | ............... | B29C 65/8215 |
| 2018/0297142 A1 * | 10/2018 | Sakamoto | ............... | B23K 11/20 |
| 2019/0047087 A1 * | 2/2019 | Kawamoto | ............... | B29C 66/712 |
| 2019/0076962 A1 * | 3/2019 | Kawamoto | ............... | B23K 26/244 |
| 2019/0257333 A1 * | 8/2019 | Fujiwara | ............... | B23K 33/00 |
| 2020/0298339 A1 * | 9/2020 | Kawamoto | ............... | B29C 65/64 |
| 2020/0298340 A1 * | 9/2020 | Fujiwara | ............... | B23K 9/02 |
| 2020/0398375 A1 * | 12/2020 | Fujiwara | ............... | B23K 26/342 |
| 2020/0398378 A1 * | 12/2020 | Fujiwara | ............... | B23K 26/323 |

FOREIGN PATENT DOCUMENTS

| | | | | |
|---|---|---|---|---|
| DE | 102010044886 A1 * | 5/2011 | ............ | B21J 15/00 |
| DE | 102011085303 | 5/2012 | | |
| JP | 58-110175 | 6/1983 | | |
| JP | 5-104246 | 4/1993 | | |
| JP | 7-015172 U | 3/1995 | | |
| JP | 2002-010813 | 1/2002 | | |
| JP | 2005-000986 | 1/2005 | | |
| JP | 2008-6465 | 1/2008 | | |
| JP | 2012-006034 | 1/2012 | | |
| JP | 4957093 B2 * | 6/2012 | | |
| JP | 2012-254481 | 12/2012 | | |
| JP | 2012254481 A * | 12/2012 | | |
| JP | 2014113616 A * | 6/2014 | | |
| JP | 2014-226698 | 12/2014 | | |
| JP | 2015-042417 | 3/2015 | | |
| JP | 2015-167972 A | 9/2015 | | |
| WO | WO-2018042681 A1 * | 3/2018 | ............ | B23K 10/02 |

OTHER PUBLICATIONS

Machine English translation of JP-4957093-B2 (Year: 2012).*
Machine English translation of WO-2018042681-A1 (Year: 2018).*
Extended European Search Report issued Apr. 9, 2019 in corresponding European Patent Application No. 17774750.8.
Extended European Search Report issued Feb. 19, 2020 in corresponding European Patent Application No. 19206049.9.
International Search Report of PCT application No. PCT/JP2017/011976 dated Apr. 25, 2017.
Office Action issued Aug. 25, 2021 in corresponding European Patent Application No. 17774750.8.
Extended European Search Report issued Oct. 12, 2023 in corresponding European Patent Application No. 17774750.8.
EPC Office Action dated Aug. 11, 2025 in related European Patent Application No. 19206049.9, 4 pages.

* cited by examiner

JOINT STRUCTURE

This application is a U.S. national stage application of the PCT International Application No. PCT/JP2017/011976 filed on Mar. 24, 2017, which claims the benefit of foreign priority of Japanese patent applications No. 2016-067198 filed on Mar. 30, 2016 and No. 2016-077848 filed on Apr. 8, 2016, the contents all of which are incorporated herein by reference.

TECHNICAL FIELD

The present disclosure relates to a joint structure including similar types of metallic materials and at least one different type of material sandwiched between the metallic materials. The joint structure is produced using arc or plasma as a heat source.

BACKGROUND ART

The recent globalization of the production of automobiles and other transportation vehicles has created a growing demand for reducing the total cost for each vehicle, in particular, for improving throughput by reducing production time.

Furthermore, there is a global demand for reducing $CO_2$ emissions to prevent global warming, and this demand has been answered by the transportation vehicle industry, which is making increasing efforts to improve fuel efficiency. One of the efforts is to reduce the vehicle weights by, for example, increasing the proportion of light-weight materials in the vehicles.

With such a background, spot welding is popular in this industry. However, this welding is a kind of resistance welding, in which materials to be welded are pressurized by upper and lower electrodes used as a spot welding gun until there is no gap left between the materials, and then the electrodes are energized. For this reason, spot welding is not suitable for one side welding. Spot welding also imposes limitations on the product shape because the part to be welded has to be sandwiched from above and below by the gun. Another disadvantage of the welding is that pressurizing the part to be welded needs a space into which the gun enters above and below the materials to be welded. Still another disadvantage is that beside welding time, spot welding takes additional time, such as the time to carry the heavy gun, the time to pressurize the materials after the gun reaches the part to be welded, and the time to cool the welded part.

Meanwhile, the industry is trying to reduce the weight of automobile materials by changing some of the materials from steel to light metal such as aluminum. This trend has created a growing demand for techniques and structures that allow the joining of light metal and steel.

Examples of conventional tools for joining different types of materials together include rivets for spot welding, and adhesives. Patent Literature 1 discloses the following techniques: a pressurization method in which a rivet and a material of the same type as the rivet sandwich a different type of material and pressurize it; a rivet having a shape capable of absorbing the plastic flow of the different type of material caused by welding heat input; and methods of crimping and spot welding capable of the absorption. This configuration ensures the space into which deformed part of the different type of material is moved during the crimping and spot welding. The configuration also prevents depression of the different type of material due, for example, to misalignment of the electrodes during spot welding, thereby maintaining the joint strength.

CITATION LIST

Patent Literature

PTL 1: Japanese Unexamined Patent Application Publication No.2015-42417

SUMMARY

The joint structure according to the present disclosure includes a first metallic material having a first projection, a second metallic material similar in type to the first metallic material and weldable to the first metallic material, and a different type of material different in type from the first metallic material and the second metallic material, the different type of material having a first penetrating part and sandwiched between the first metallic material and the second metallic material, the different type of material being difficult to be welded to the first metallic material and the second metallic material. The first projection is smaller in diameter or width than the first penetrating part and is spaced radially or widthwise from the rim of the first penetrating part by a first gap. The first projection is positioned in the first penetrating part and is spaced from the second metallic material by a second gap in the thickness direction of the first penetrating part. The second gap has the size of a predetermined percentage of the thickness of the first projection of the first metallic material to which arc welding id applied. The first metallic material and the second metallic material are melted and joined together inside the first penetrating part to compress and fix the different type of material, so that the different type of material, the first metallic material, and the second metallic material are fixed together.

DESCRIPTION OF EMBODIMENTS

The Reason for Which the Present Disclosure has Been Made

Prior to describing the exemplary embodiments of the present disclosure, the reason for which the present disclosure has been made will now be described.

Figure 14:
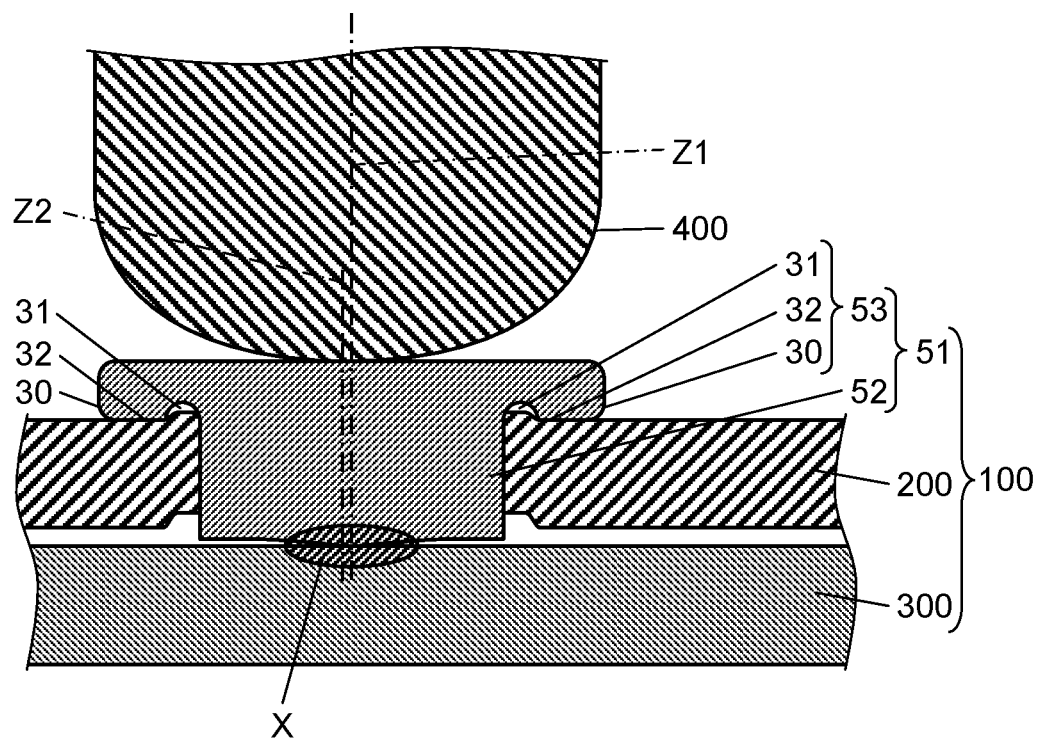
FIG. 14 is a schematic diagram of joining different types of materials together in a conventional manner.

Conventional joint members including a material that is different in type from the other materials will now be described with reference to FIG. 14. Crimping and spot welding uses a space to accommodate the deformed part of a different type of material 200. In addition, electrode 400 is to be prevented from being misaligned during spot welding so as to prevent depression of material 200, thereby maintaining the joint strength between the joint members. These conditions can be satisfied by using rivets with a complicated shape, such as radius (R)-chamfered part 30 or annular groove 31. Rivet 51 with such a complicated shape can be fabricated by high precision processing technology, thus increasing the production cost. Furthermore, spot welding, which is a kind of resistance welding, involves time-consuming processes, such as pressurization, energization, cooling, and transfer. Moreover, a set of joint members 100 is sandwiched from both sides, which indicates a low degree of design freedom.

Adjacent rivets too close to each other can cause current diversion during spot welding. This would result in insufficient formation of a nugget, which is a part welded and solidified in the resistance welding. A desired nugget without current diversion can be formed by setting the pitch between adjacent rivets at not less than the minimum pitch. Therefore, rivets cannot be arranged at a pitch not more than the minimum pitch, making it impossible to improve joint stiffness at required positions.

The present disclosure provides a simple joint structure that can join different types of materials together by arc or plasma welding so as to improve the throughput.

First Exemplary Embodiment

Figure 1:
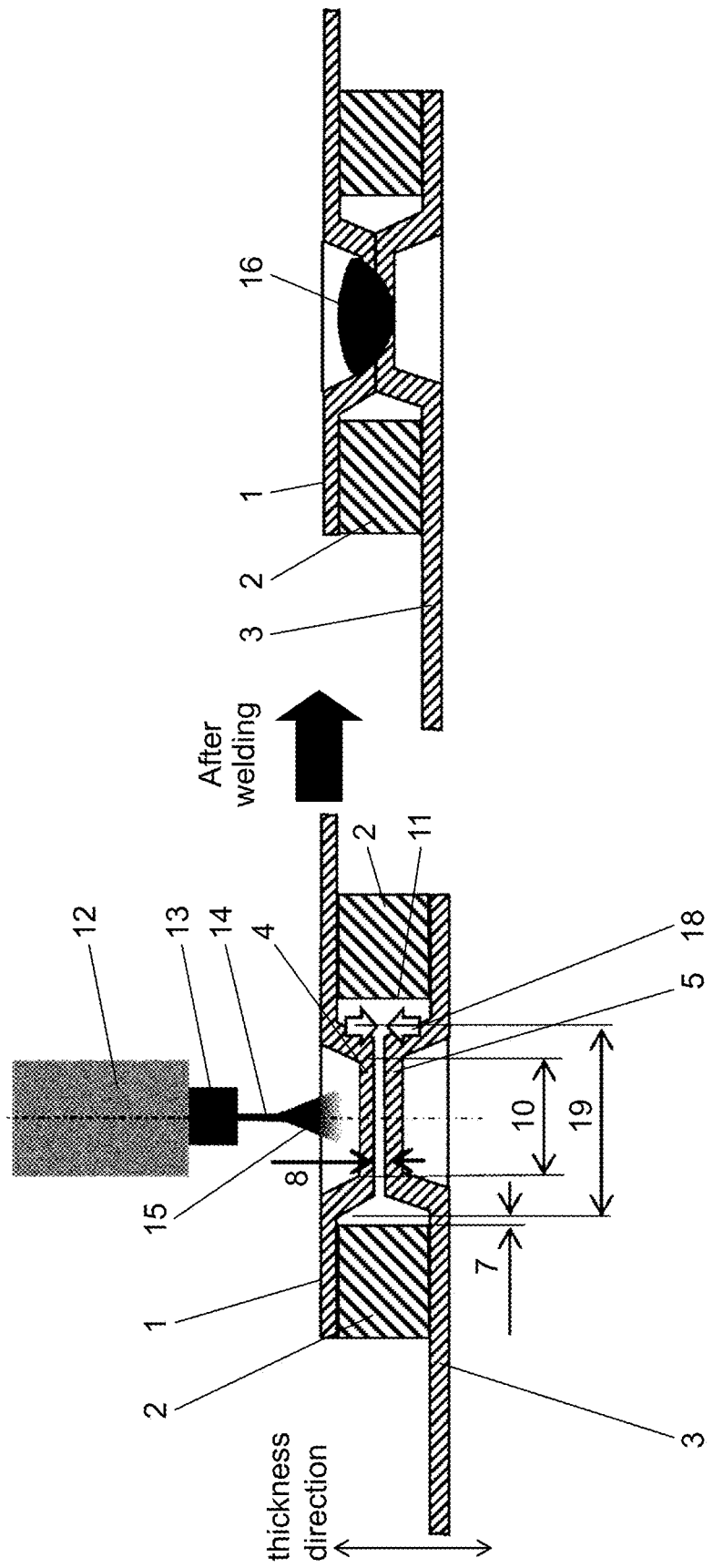
FIG. 1 is a schematic diagram of a joint structure during arc welding according to a first exemplary embodiment of the present disclosure.
Figure 4:
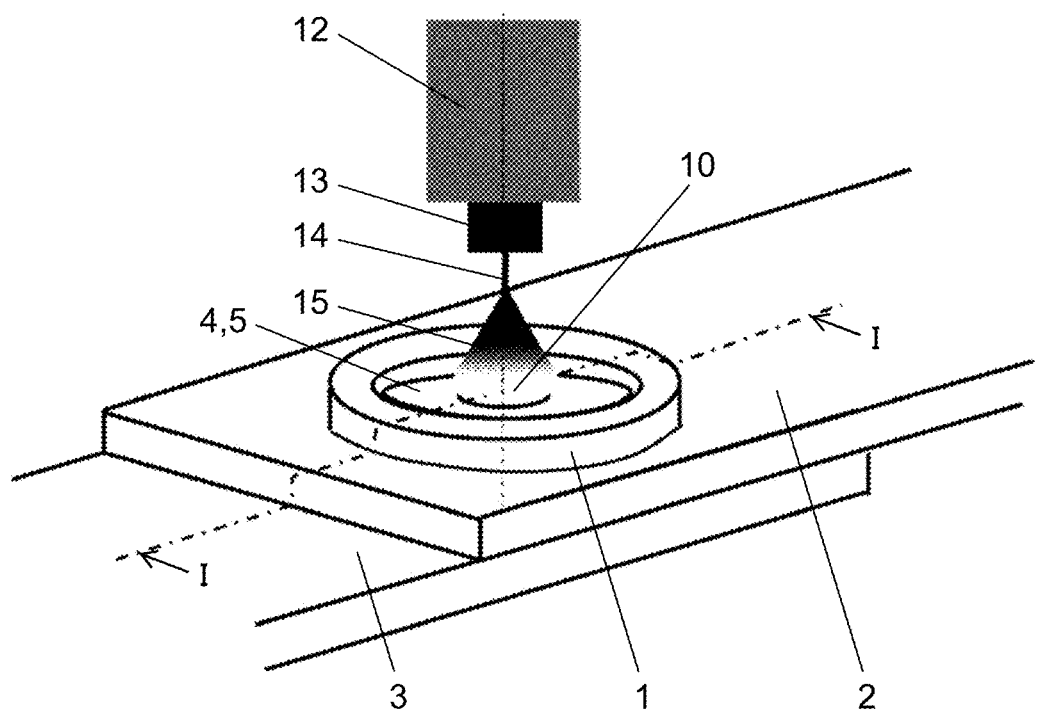
FIG. 4 is a schematic diagram of another joint structure during arc welding according to the first exemplary embodiment of the present disclosure.
Figure 5:
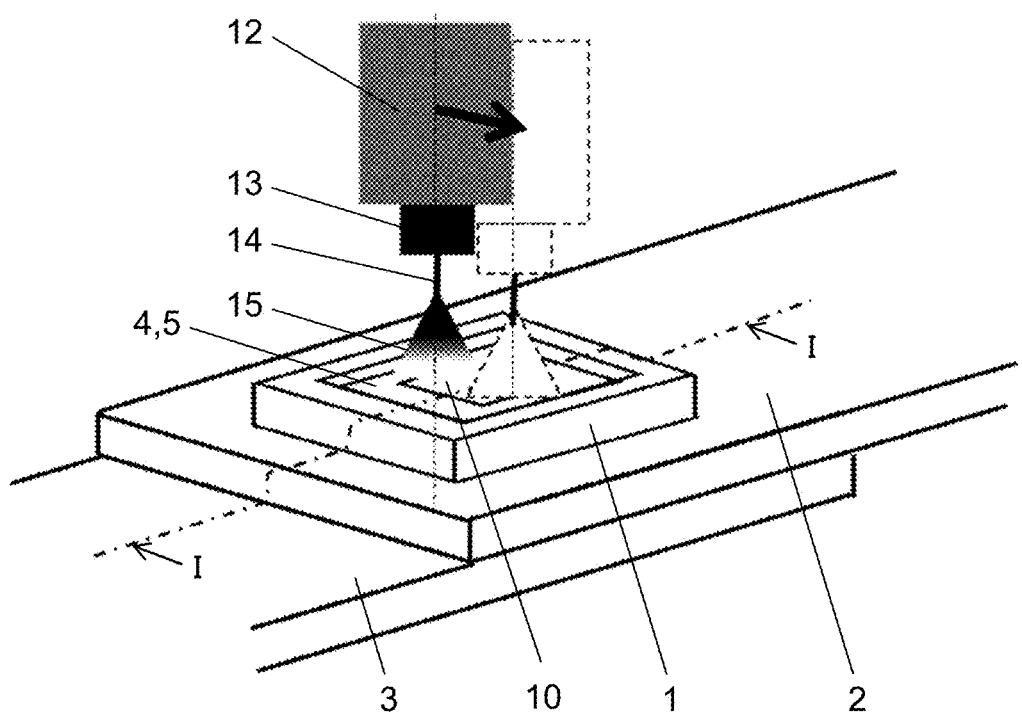
FIG. 5 is a schematic diagram of another joint structure during arc welding according to the first exemplary embodiment of the present disclosure.

The present exemplary embodiment will be described with reference to FIGS. 1 to 9. FIG. 1 shows a joint structure composed of the following joint members: first material 1, which is the first metallic material of the present disclosure; third material 3, which is the second metallic material of the present disclosure, and which is similar in type to first material 1; and second material 2, which is different in type from first and third materials 1 and 3. FIG. 4 is a schematic diagram in which the upper plate is circular-shaped first material 1. FIG. 5 is a schematic diagram in which the upper plate is rectangular-shaped first material 1. The lines I-I shown in FIGS. 4 and 5 correspond to the cross sectional view of FIG. 1.

In FIG. 1 when first material 1 and third material 3 both made of metal are joined together with second material 2 as a different type of material, second material 2 is sandwiched between first and third materials 1 and 3. First material 1 and third material 3 are similar types of metallic materials and weldable to each other. Second material 2 is different in type from and is difficult to be welded to first and third materials 1 and 3.

Second material 2 has first through-hole 11, which is an example of the first penetrating part of the present disclosure. First material 1 has first projection 4, and third material 3 has second projection 5. Projections 4 and 5 are positioned in first through-hole 11 in such a manner as to oppose each other. This arrangement prevents misalignment of first and third materials 1 and 3 with respect to first through-hole 11. It therefore becomes possible to visually check the mark of an arc welding position and the appropriateness of the position of the bead.

The first penetrating part is first through-hole 11 in the present exemplary embodiment, but may alternatively be, for example, a through groove.

The similar types of metallic materials are defined as metallic materials weldable to each other. They can not only be identical materials, but also be materials weldable to each other, such as ferrous metals and nonferrous metals. To be more specific, materials 1 and 3 can be a combination of ferrous metals, such as two types of mild steel; mild steel and stainless steel; two types of stainless steel; mild steel and high-tensile steel; high-tensile steel and stainless steel; and two types of high-tensile steel. Materials 1 and 3 can also be a combination of nonferrous metals, such as two types of aluminum; aluminum and an aluminum alloy; and two types of aluminum alloys.

Second material 2 is defined as a material different from and difficult to be welded to first material 1 and third material 3, which are of similar types. For example, when first material 1 and third material 3 are ferrous metals, second material 2 is nonferrous metal, such as copper or aluminum. As another example, when first material 1 and third material 3 are metals, second material 2 is resin, such as carbon fiber reinforced plastic (CFRP) or polyethylene terephthalate (PET).

First projection 4 of first material 1 and second projection 5 of third material 3 are substantially identical in shape in the present exemplary embodiment. The clearance between outer edge region 19 of first projection 4 and second projection 5 opposing each other, and the rim of first through-hole 11 of second material 2 is referred to as first gap 7. A clearance in the thickness direction between first projection 4 and second projection 5 positioned in first through-hole 11 is referred to as second gap 8. The region inside the inner edge of projections 4 and 5 when seen from above is referred to as inner edge region 10 of projections 4 and 5. As shown in FIG. 4, welding is performed by applying arc 15, from above first material 1, to inner edge region 10 of second projection 5 (see FIGS. 1 and 4), which is the region that can be joined. The resulting bead is weld 16 as shown in FIG. 1. Thus, when arc 15 is applied to first material 1, first material 1 corresponds to the first metallic material of the present disclosure, and third material 3 corresponds to the second metallic material of the present disclosure.

The term "thickness direction" is defined as the direction perpendicular to the main surfaces of first, second, and third materials 1, 2, and 3 before welding, and is shown by the arrows in FIG. 1.

Next, second gap 8 in the thickness direction during and after welding will now be described with reference to FIG. 1.

Figure 6:
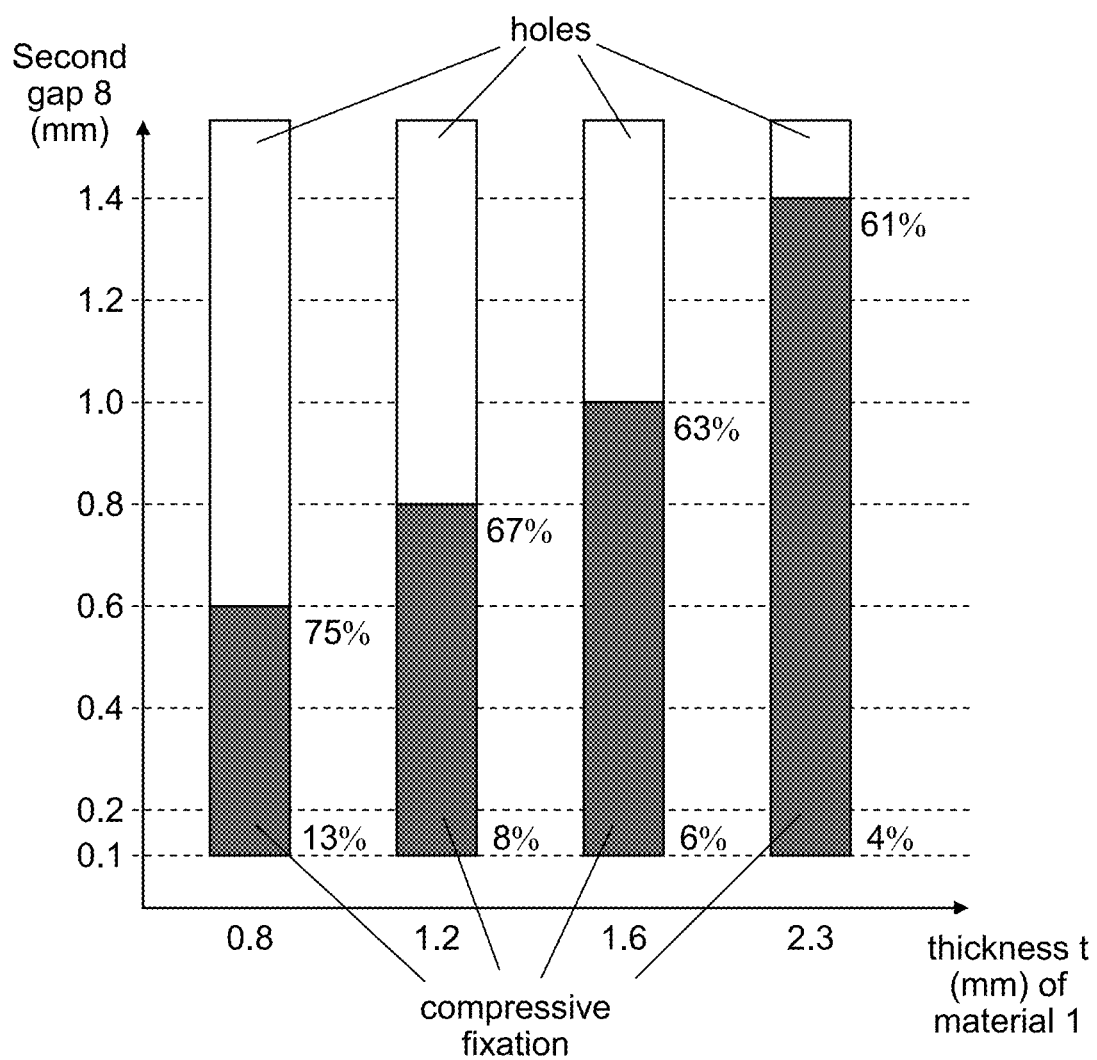
FIG. 6 is a graph showing the measurement results of the relationship between the thickness of the first material and the size of the second gap in the thickness direction according to the first exemplary embodiment of the present disclosure.

Arc spot welding is performed by applying arc 15 to inner edge region 10 of projections 4 and 5 so as to form weld 16. The molten metal of weld 16 is solidified and shrunk while first material 1 and third material 3 are being welded. This results in shrinking second gap 8 between projections 4 and 5. Assume that the size of second gap 8 is set at 4% to 75% of the thickness of first material 1 or third material 3 to which arc 15 is applied. In this case, the solidification shrinkage of weld 16 functions as compressive force 18 of first material 1 and third material 3 to compress second material 2, so that second material 2 can be compressed and fixed between first material 1 and third material 3. The range of 4% to 75% is calculated from experimental data. An example of the data is shown in FIG. 6. FIG. 6 is a graph showing the measurement results of the relationship between the thickness t of first projection 4 of the first material and the size of second gap 8 between projections 4 and 5 in the thickness direction.

In the arc spot welding shown in FIG. 6, first material 1 and third material 3 are both mild steel, and second material 2 is PET. First material 1 is placed on third material 3, and metal active gas (MAG) arc welding is applied at an output current of 100 A to 250 A for 0.3 seconds. Arc 15 is applied, from above in the thickness direction, to inner edge region 10 of first projection 4, which is the region to be irradiated. This arc welding is performed under the following conditions: inner edge region 10 of projections 4 and 5 is an area with a diameter of φ 10 mm; and first through-hole 11 of second material 2 has a diameter of φ 12 mm. Furthermore, the region to be irradiated with arc 15 that is applied to projections 4 and 5 in the thickness direction is set smaller, by a predetermined distance, than the diameter or width of projections 4 and 5. To be more specific, the spot diameter is φ 8 mm, which is similar to and smaller than inner edge region 10 to which arc 15 is applied.

When the thickness t of first projection 4 to which arc 15 is applied is 0.8 mm, second gap 8 can be in the range of 0.1 mm to 0.6 mm in order to allow second material 2 to be compressed and fixed by the solidification shrinkage of the molten metal in weld 16. If second gap 8 is larger than 0.6 mm, there will be holes (Opening holes formed in the weld 16 due to insufficient filling of molten metal during welding) in weld 16, demonstrating a defective weld. Therefore, the effective range of second gap 8 is between 13% and 75%, inclusive of the thickness of first material 1.

When the thickness t is 2.3 mm, second gap 8 can be in the range of 0.1 mm to 1.4 mm in order to allow second material 2 to be compressed and fixed by the solidification shrinkage of the molten metal in weld 16. If second gap 8 is larger than 1.4 mm, there will be holes (Opening holes formed in the weld 16 due to insufficient filling of molten metal during welding) in weld 16, demonstrating a defective weld. Thus, successful welding can be obtained by determining the size of second gap 8 in the thickness direction according to the thickness of first material 1 to which arc 15 is applied. To be more specific, the appropriate size of second gap 8 is from 4% to 61%, inclusive of the thickness of first material 1.

This indicates that the molten metal corresponding to up to 60% to 75% of the thickness t of first material 1 flows into second gap 8 to achieve a joint with no hole in the weld. If exceeding 60% to 75% of the thickness t of first material 1, second gap 8 cannot be filled with the molten metal, causing the weld to have holes. Unlike laser welding or tungsten-inert-gas (TIG) welding performed without a filler wire, arc welding performed using welding wire 14, which is a consumable electrode, has a large gap tolerance. This is because the deposition of the molten metal of welding wire 14 in weld 16 increases the proportion of second gap 8 with respect to the thickness t of first material 1 to which arc 15 is applied.

In contrast, if second gap 8 between projections 4 and 5 is smaller than 0.1 mm, compressive force 18, which is generated when first and third materials 1 and 3 are melted and joined together, is too small to compress and fix second material 2 in between.

Thus, the solidification shrinkage of weld 16 in second gap 8 during welding increases with an increase in the size of second gap 8 within the range of ensuring the necessary amount of molten metal, or in other words, within the range of not generating holes (Opening holes formed in the weld 16 due to insufficient filling of molten metal during welding). This results in an increase in compressive force 18, with which second material 2 is sandwiched between first material 1 and third material 3.

First projection 4 of first material 1 and second projection 5 of third material 3 are identical in shape in the present exemplary embodiment, but are not necessarily identical. Furthermore, arc 15 is not necessarily applied from the first material 1 side. If the size of second gap 8 is set at 4% to 61%, inclusive, of the thickness of the region to be irradiated of first material 1 or third material 3 to which arc 15 is applied, second gap 8 can be completely filled with molten metal. As a result, the solidification shrinkage of weld 16 allows second material 2 to be compressed and fixed between first material 1 and third material 3. Therefore, arc welding can be performed by applying arc from below instead of from above, or in other word, from the third material 3 side. Furthermore, first material 1 and third material 3 are similar types of metallic materials, namely, mild steel in the present exemplary embodiment. However, materials 1 and 3 may be different types of metallic materials from each other as long as they are weldable to each other and have sufficient joint strength. First material 1 and third material 3 can be a combination of ferrous metals, such as two types of mild steel; two types of stainless steel; two types of high-tensile steel; mild steel and high-tensile steel; and high-tensile steel and stainless steel. Materials 1 and 3 can also be a combination of nonferrous metals, such as two types of aluminum; two types of aluminum alloys; and aluminum and an aluminum alloy. Meanwhile, second material 2 can be copper, which is difficult to be arc welded; resin; or other materials that are difficult to be welded to first material 1 and third material 3 (e.g., first and third materials 1 and 3 are mild steel, and second material 2 is aluminum, or vice versa).

Although not illustrated, two different types of second materials 2 can be sandwiched between first and third materials 1 and 3 as similar types of metallic materials and be joined together by arc welding, with second gap 8 in a proper state. In this case, second materials 2 sandwiched between first and third materials 1 and 3 can be compressed and fixed by compressive force 18 generated by the solidification shrinkage of the molten metal of first and third materials 1 and 3.

Next, first gap 7 during and after welding will now be described with reference to FIG. 1.

The region, of first projection 4, to be welded by arc 15 applied in the thickness direction is smaller than inner edge region 10 and smaller than the diameter or width of first projection 4 by a predetermined distance.

A key to successful melting of second material 2 due to the heat transferred from weld 16 by the welding heat input is the positional relationship between outer edge region 19 of projections 4 and 5 to which arc 15 is applied and the rim of first through-hole 11 of second material 2.

Assume that first gap 7 between outer edge region 19 of projections 4, 5 and the rim of first through-hole 11 of second material 2 is in a proper range. In this case, part of second material 2 that is around first through-hole 11 is melted by the welding heat input while first and third materials 1 and 3 are being welded. The molten part of second material 2 flows and is tightly fixed around outer edge region 19 of projections 4 and 5. In other words, the welding heat input to first projection 4 indirectly heats and melts the part of second material 2 that is around first through-hole 11, so that the molten part of second material 2 flows and is tightly fixed to the outer periphery of first projection 4. As a result, second material 2 can not only be compressed and fixed by the solidification shrinkage of weld 16 but also be tightly fixed to outer edge region 19 of projections 4 and/or 5 in the direction crossing the thickness direction of second material 2.

If welding is performed when first gap 7 is very small, the part of second material 2 that is around first through-hole 11 is excessively subjected to the heat from around outside outer edge region 19 of projections 4 and 5 to which the welding heat input to weld 16 is transferred during the application of arc 15. This may cause the molten part of second material 2 that is around first through-hole 11 to flow into second gap 8. Moreover, when made of resin or other low-boiling-point materials, second material 2 may vaporize and blow off, causing weld 16 to be defective.

Assume that first gap 7 between the rim of first through-hole 11 and outer edge region 19 is at least 2.0 mm when second material 2 is resin, or is at least 1.5 mm when second material 2 is CFRP. Thus, when the distance between outer edge region 19 and the rim of first through-hole 11 is too large, the part of second material 2 that is around first through-hole 11 is unlikely to receive the welding heat input to weld 16 and is unlikely to melt. This would make it difficult for second material 2 to flow and to be tightly fixed around outer edge region 19 of projections 4 and 5. This causes second material 2 to be compressed and fixed by the solidification shrinkage alone. In this case, the state of melting of second material 2 by the heat generated by the welding of first and third materials 1 and 3 is changed by the size of first gap 7, which is the distance at which the heat of arc 15 is transferred from outer edge region 19 to first through-hole 11, and by the type of second material 2.

The positioning of projections 4 and 5 with respect to the diameter of first through-hole 11 into which projections 4 and 5 are positioned can be achieved by using an unillustrated clamping tool, a positioning pin, or a robot arm for supporting and positioning. The size of outer edge region 19 of embossed projections 4 and 5 actually corresponds to the offset in the range of about 1 mm to the thickness of materials 1 and 3; however, the size of outer edge region 19 in the present disclosure is simplified as 1 mm.

Figure 7:
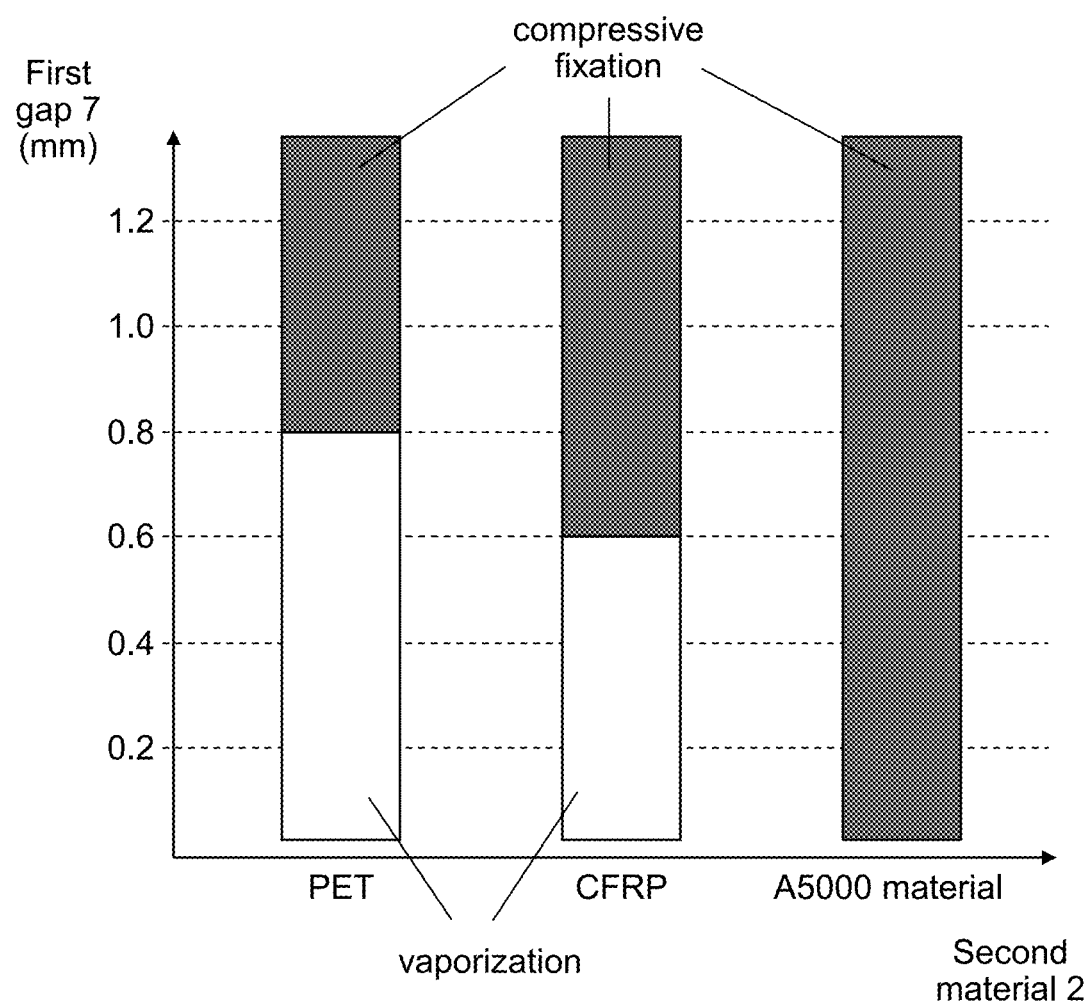
FIG. 7 is a graph showing the measurement results of the relationship between the type of the second material and the size of the first gap according to the first exemplary embodiment of the present disclosure.

An example of experimental data is shown in FIG. 7. FIG. 7 is a graph showing the measurement results of the relationship between the type of second material 2 and the size of first gap 7.

The types of second material 2 shown in FIG. 7 are the following: PET and CFRP, which are resin materials; and an A5000 series aluminum alloy, which is nonferrous metal.

First gap 7 is the clearance between the rim of first through-hole 11 of second material 2 and outer edge region 19 of projections 4 and 5 of first material 1 and third material 3.

In this example, first material 1 and third material 3 are mild steel with a thickness t of 1.6 mm. Second material 2, which is one of the different types and has a thickness t of 2.0 mm, is sandwiched between materials 1 and 3. MAG arc welding is applied to these stacked materials at an output current of 100 A to 250 A for 0.3 seconds. Arc 15 is applied from above to inner edge region 10 of first projection 4, which is the region to be irradiated. This arc welding is performed under the following conditions: inner edge region 10 of projections 4 and 5 is an area with a diameter of $\varphi$ 10 mm; first through-hole 11 of second material 2 has a diameter of $\varphi$ 12 mm; and the spot diameter of $\varphi$ 8 mm, which is similar to inner edge region 10.

If second material 2 is PET, which is a resin material, then first gap 7 can be at least 0.8 mm, or in other words, at least 40% of the thickness of second material 2. In this case, even under the influence of the heat generated by the welding of inner edge region 10 of first and third materials 1 and 3, molten part of second material 2 is prevented from flowing into second gap 8 between projections 4 and 5 and from causing weld 16 to be defective. As a result, second material 2 can be compressed and fixed.

Assume, on the other hand, that first gap 7 is less than 0.8 mm, or in other words, less than 40% of the thickness of second material 2, and that outer edge region 19 is too close to the rim of first through-hole 11 of second material 2. In this case, second material 2 is partly melted by the heat generated by the welding of inner edge region 10 of projections 4 and 5. The molten part of second material 2 flows into second gap 8 between projections 4 and 5 and may vaporize and blow off, causing weld 16 to be defective.

If second material 2 is CFRP, which is fiber reinforced resin, then first gap 7 can be at least 0.6 mm, or in other words, at least 30% of the thickness of second material 2. In this case, even under the influence of the heat generated by the welding of inner edge region 10 of first and third materials 1 and 3, molten part of second material 2 is prevented from flowing into second gap 8 between projections 4 and 5. As a result, second material 2 can be compressed and fixed. Assume, on the other hand, that first gap 7 is less than 0.6 mm, or in other words, less than 30% of the thickness of second material 2, and that outer edge region 19 is too close to the rim of first through-hole 11 of second material 2. In this case, second material 2 is partly melted by the heat generated by the welding of inner edge region 10 of projections 4 and 5. The molten part of second material 2 flows into second gap 8 between projections 4 and 5 and may vaporize and blow off, causing weld 16 to be defective. As described above, the properties such as the melting and boiling points of the resin material of second material 2 to be sandwiched between the similar types of metallic materials influence the allowable size of first gap 7 during welding. Compared with laser welding, arc welding has a high heat input due to arc heat, so that first gap 7 has a narrow tolerance.

Further assume that second material 2 is an A5000 series aluminum alloy, which is an example of nonferrous metal. In this case, even under the influence of the heat generated by the application of arc 15 to inner edge region 10 of projections 4 and 5, the molten part of second material 2 is prevented from flowing into second gap 8 between projections 4 and 5 and from causing weld 16 to be defective. As a result, second material 2 can be compressed and fixed in a stable manner.

The above-described experimental data shows the difference depending on the type of second material 2. When second material 2 is a resin material, it has tendencies similar to the PET shown in FIG. 7. Among resin materials, fiber reinforced resins have tendencies similar to those of CFRP. Assume that second material 2 is an A5000 series aluminum alloy, which is nonferrous metal. In this case, it never occurs that the part of second material 2 that is around first through-hole 11 vaporizes and blows off, causing weld 16 to be defective due to the welding heat input generated by the application of arc 15 to projections 4 and 5. Other nonferrous metals have similar tendencies. Thus, when the second material is nonferrous metal, it never occurs that part of second material 2 is melted by heat, and that the molten part flows into second gap 8 between projections 4 and 5.

FIG. 5 shows an example of the projection with a shape other than a circle. In FIG. 5, in the joint structure composed of first and third materials 1 and 3 and second material 2, first material 1 as the upper plate in the thickness direction is rectangular-shaped so that the welding seam is straight. When the joint strength needed for weld 16 is directional, the longitudinal side of a rectangular joint structure is arranged in the direction in which a high joint strength is needed. This requires a smaller area than in the case that first projection 4 and second projection 5 are large square-shaped. Furthermore, the straight welding seam shown in FIG. 5 takes less time than joining a plurality of positions of a circular projection.

Figure 8:
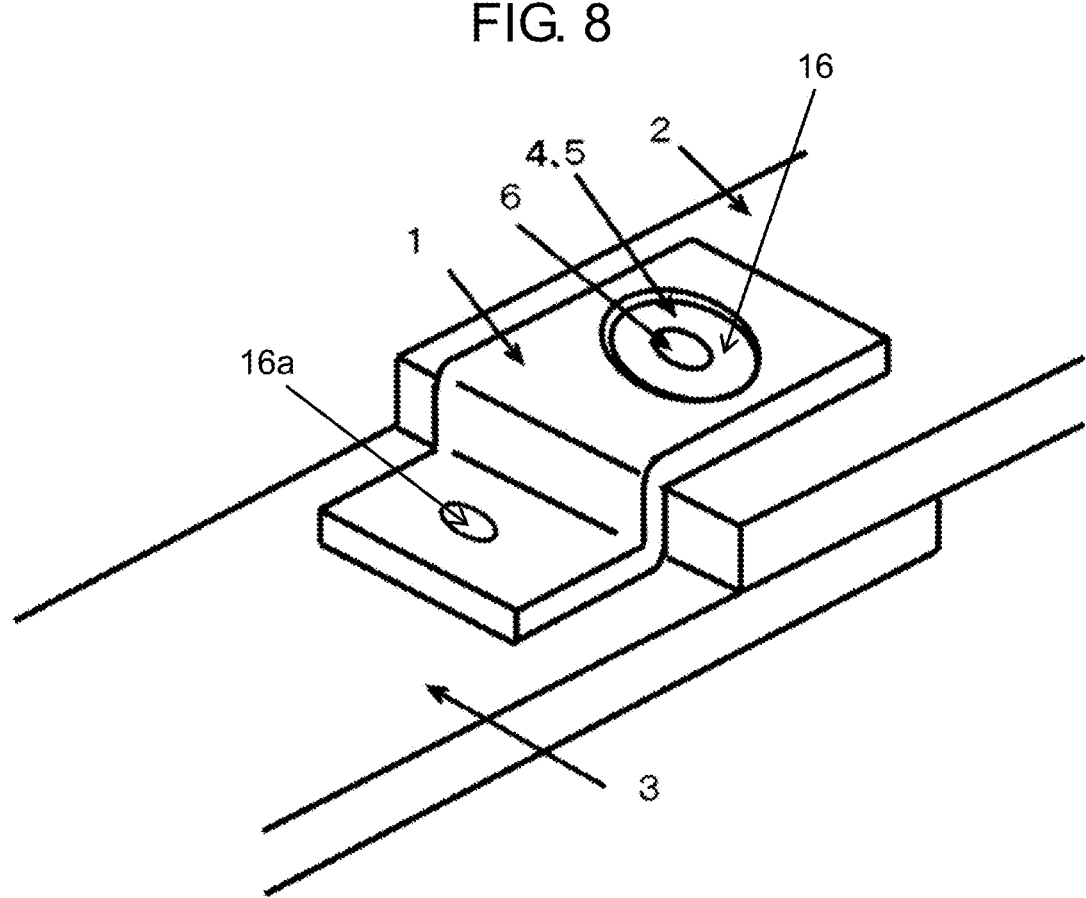
FIG. 8 is a schematic diagram of another joint structure during arc welding according to the first exemplary embodiment of the present disclosure.
Figure 9:
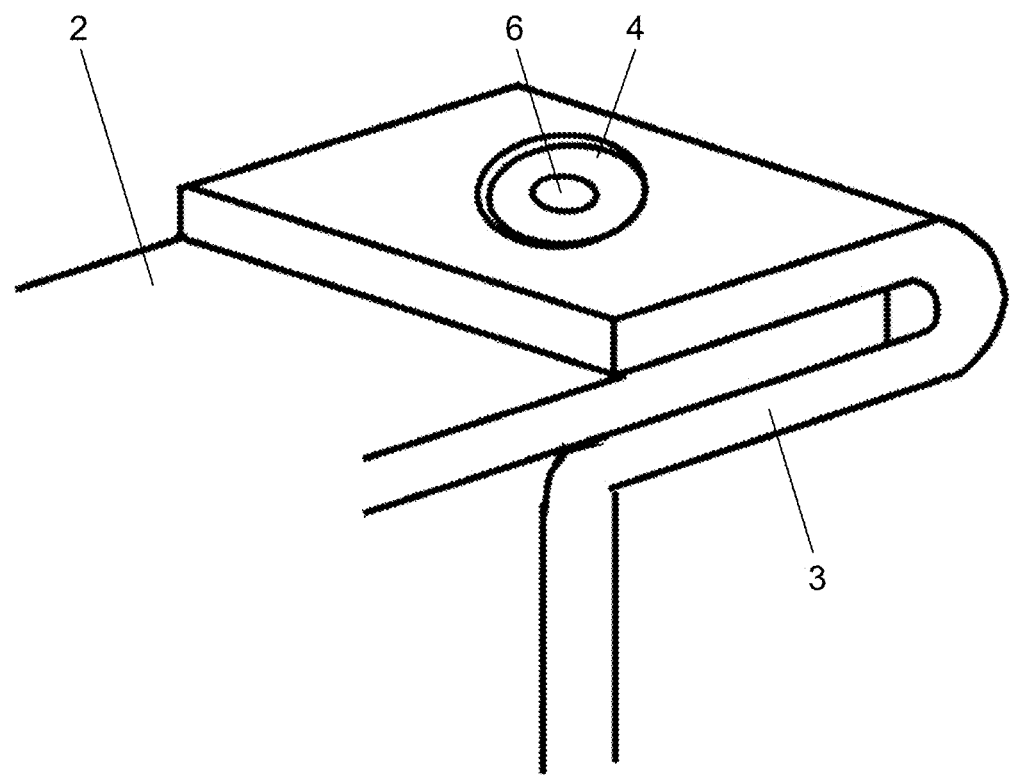
FIG. 9 is a schematic diagram of another joint structure during arc welding according to the first exemplary embodiment of the present disclosure.

FIGS. 8 and 9 show examples of increasing the joining strength and simplifying the positioning.

In FIG. 8, when third material 3 and second material 2 are joined together, first material 1 functions to position second material 2. To be more specific, second material 2 is brought into contact with the stepped portion of first material 1 and is sandwiched between first material 1 and third material 3.

The joint structure shown in FIG. 8 has an improved tensile strength of the joint. To be more specific, the joint structure is a double-supported structure in which first material 1 having first projection 4 is joined with third material 3 at weld 16 via second material 2, and is further joined directly to third material 3 at weld 16a. In this case, when an external force such as the tensile or torsion stress of second material 2 is applied to third material 3, the stress is dispersed between weld 16 and weld 16a. This prevents stress concentration on weld 16 between first material 1 and third material 3, which are joined via second material 2. This improves the joining strength between the similar types of metallic materials and the different type of material, and hence, the joining strength of the entire joint structure.

Third material 3 can be folded as shown in FIG. 9, so that the upper plate part of third material 3 can substitute for first projection 4 of first material 1 so as to sandwich second material 2 without using first material 1. This configuration eliminates the need to use a jig for fixing first material 1. This configuration also makes it possible to insert second material 2 into third material 3 for temporary fixation, thereby facilitating the positioning of second material 2.

In FIG. 9, the first metallic material of the present disclosure corresponds to the upper plate part formed by folding third material 3. The second metallic material of the present disclosure corresponds to the lower plate part formed by folding third material 3. In short, first and second metallic materials of the present disclosure may be integrated before welding.

As described above, the joint structure of the present exemplary embodiment welded with arc 15 includes a first metallic material having first projection 4; a second metallic material similar in type to the first metallic material and weldable to the first metallic material; and a different type of material different in type from the first metallic material and the second metallic material, the different type of material having first through-hole 11 and sandwiched between the first metallic material and the second metallic material, the different type of material being difficult to be welded to the first metallic material and the second metallic material. First projection 4 is smaller in diameter or width than first through-hole 11 and is spaced radially or widthwise from the rim of first through-hole 11 by first gap 7. First projection 4 is positioned in first through-hole 11 and is spaced from the second metallic material by a second gap 8 in the thickness direction of first through-hole 11. Second gap 8 has a size of the predetermined percentage of the thickness of first projection 4 of the first metallic material to which arc in arc welding is applied. The first metallic material and the second metallic material are melted and joined together inside first through-hole 11 to compress and fix the different type of material, so that the different type of material, the first metallic material, and the second metallic material are fixed together.

With this configuration, the similar types of metallic materials and the different type of material difficult to be welded to the metallic materials can be joined together with high reliability. This can greatly reduce production cycle time and increase stiffness at required positions, thereby increasing the degree of design freedom of joint members.

The welding described in the present exemplary embodiment is arc welding with a consumable electrode; however, it is alternatively possible to employ TIG or plasma welding (not shown) with a non-consumable electrode.

Second Exemplary Embodiment

Figure 2:
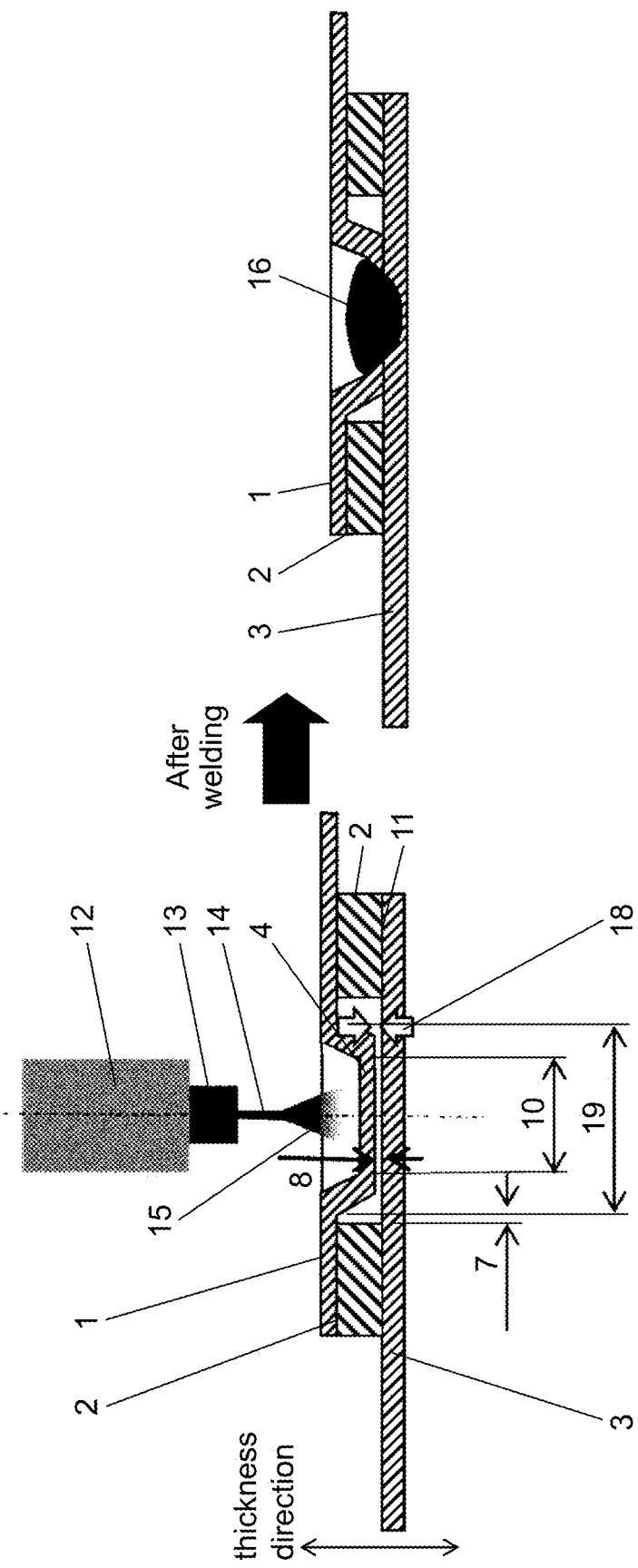
FIG. 2 is a schematic diagram of a joint structure during arc welding according to a second exemplary embodiment of the present disclosure.

A second exemplary embodiment will now be described with reference to FIG. 2. The same configuration as in the first exemplary embodiment will not be described again. The second exemplary embodiment differs from the first exemplary embodiment in that first material 1 has first projection 4 but third material 3 does not have second projection 5. The absence of second projection 5 in third material 3 can reduce the processing cost of materials. Another advantage is that the positioning of first material 1 and second material 2 is not affected by the misalignment of third material 3. In the same manner as in the first exemplary embodiment, arc welding is performed when first through-hole 11 has a second gap 8 between the first and third materials in the thickness direction. This allows the solidification shrinkage of weld 16 to function as compressive force 18 for compressing and fixing second material 2 sandwiched between first material 1 and third material 3.

First projection 4 is formed on first material 1 in the present exemplary embodiment, but may alternatively be formed on third material 3. In this case, the first metallic material of the present disclosure corresponds to third material 3, and the second metallic material of the present disclosure corresponds to first material 1. The size of second gap 8 is small enough not to cause burn-through of first or third material 1 or 3 due to arc 15 with respect to the thickness of first or third material 1 or 3 to which arc 15 is applied. This enables arc welding to be applied either from the first material 1 side or from the third material 3 side.

As described above, in the joint structure of the present exemplary embodiment formed by applying arc 15 in the thickness direction, first projection 4 is formed on the surface of the first metallic material that opposes the second metallic material so as to sandwich the second material (the different type) inside first through-hole 11 (the first penetrating part).

With this configuration, the different type of material, which is difficult to be welded to first and third materials 1 and 3 as similar types of metallic materials, can be reliably joined to these materials 1 and 3. In addition, the first projection is formed on the surface of at least one of the opposing surfaces of first and third materials 1 and 3. Therefore, second material 2 and at least of one of first and third materials 1 and 3 that has the first projection are not affected by the misalignment of the other of first and third materials 1 and 3 that does not have the first projection.

Figure 3:
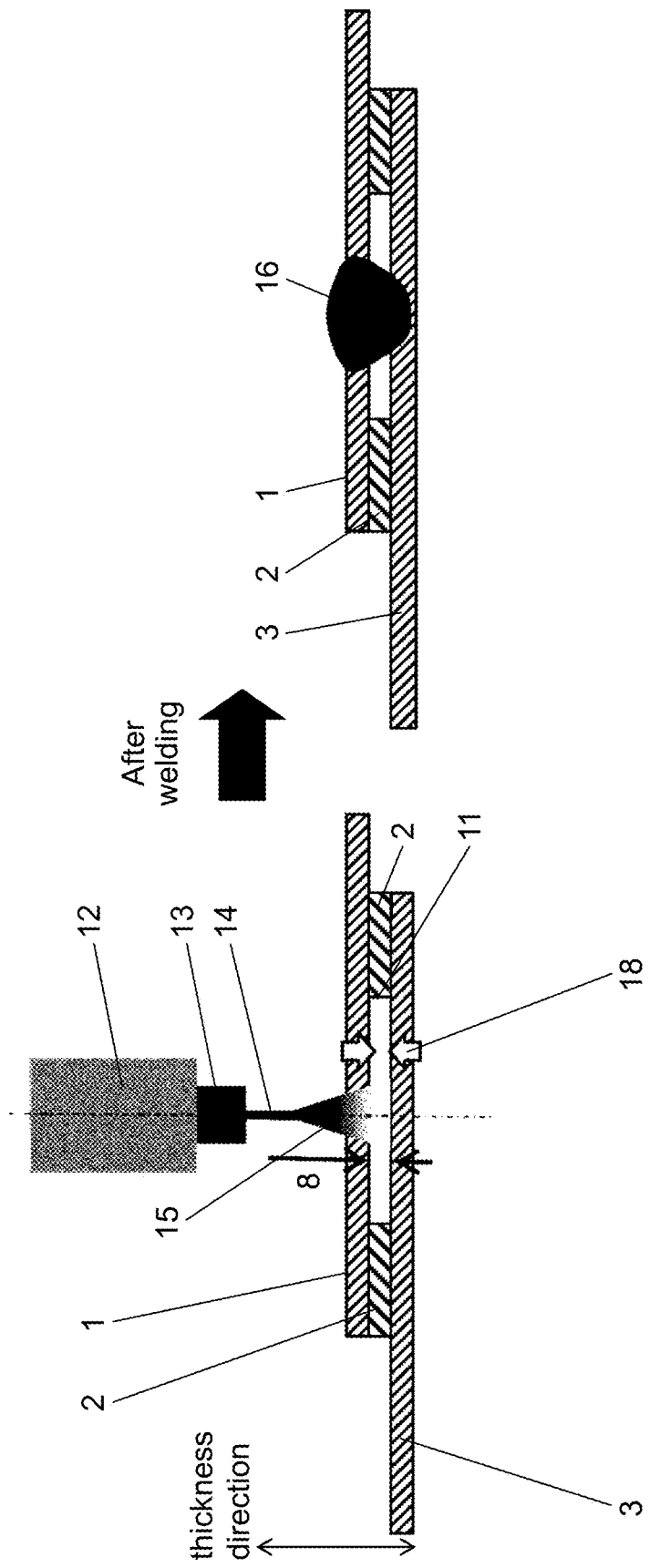
FIG. 3 is a schematic diagram of another joint structure during arc welding according to the second exemplary embodiment of the present disclosure.

Furthermore, as shown in FIG. 3, neither of the first and third materials 1 and 3 as the similar types of metallic materials may have a projection. In this case, arc welding is performed in a similar manner to the first exemplary embodiment. Arc 15 is applied to the region to be irradiated in first through-hole 11 with second gap 8 corresponding to the thickness of second material 2 sandwiched between first and third materials 1 and 3. As a result, the solidification shrinkage of weld 16 functions as compressive force 18 for compressing and fixing second material 2. In this case, the thickness of second material 2, which is equal to the size of second gap 8, is a predetermined percentage of the thickness t of first metallic material 1 to which arc 15 is applied (see FIG. 6).

Third Exemplary Embodiment

Figure 10:
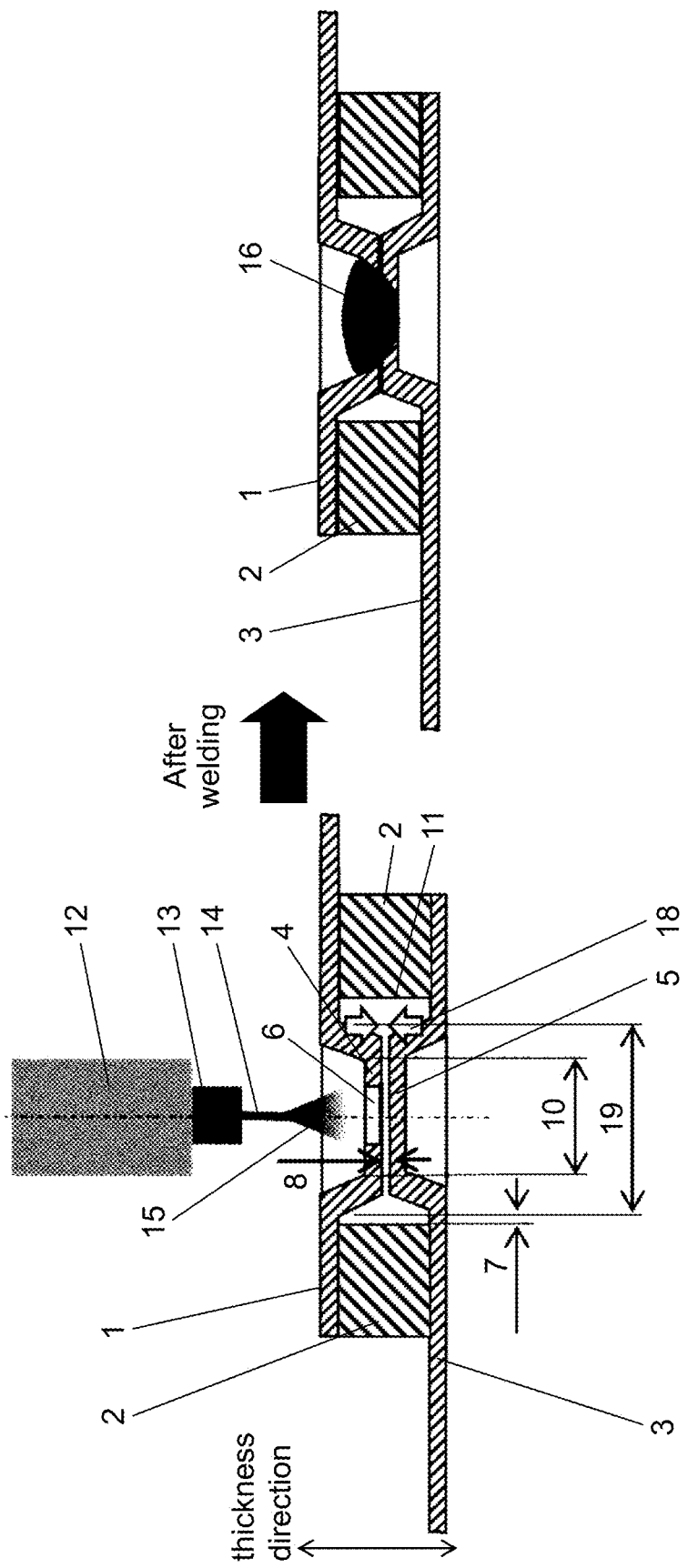
FIG. 10 is a schematic diagram of a joint structure during arc welding according to a third exemplary embodiment of the present disclosure.

A third exemplary embodiment will now be described with reference to FIGS. 10 to 12. The same configuration as in the first and second exemplary embodiments will not be described again. The third exemplary embodiment differs from the first exemplary embodiment in that first projection 4 of first material 1 to which arc 15 is applied has second through-hole 6 at its center. Second through-hole 6 (which is an example of the second penetrating part of the present disclosure) is smaller than the weld region to which arc 15 is applied. Thus, first projection 4 is shaped like a flange. Second through-hole 6 makes it unnecessary to make an opening in first material 1 as the upper plate with arc heat in order to melt and join first material 1 with third material 3. Second through-hole 6 also allows the molten metal of the welding wire to stimulate the melting of first material 1 and third material 3, thereby firmly joining the opposing surfaces of projections 4 and 5.

Not having second through-hole 6 at the center of first projection 4 of first material 1 as in the first exemplary embodiment is effective only when first material 1 as the upper plate has a small thickness t (e.g., less than 1.0 mm). This design is inappropriate when the thickness t is large (e.g., larger than 1.0 mm) because it requires a quantity of heat large enough to burn-through first material 1 as the upper plate. Meanwhile, having second through-hole 6 at the center of first projection 4 of first material 1 as in the third exemplary embodiment is very effective as long as first material 1 as the upper plate has a large thickness t (e.g., 1.0 mm or more).

Figure 11:
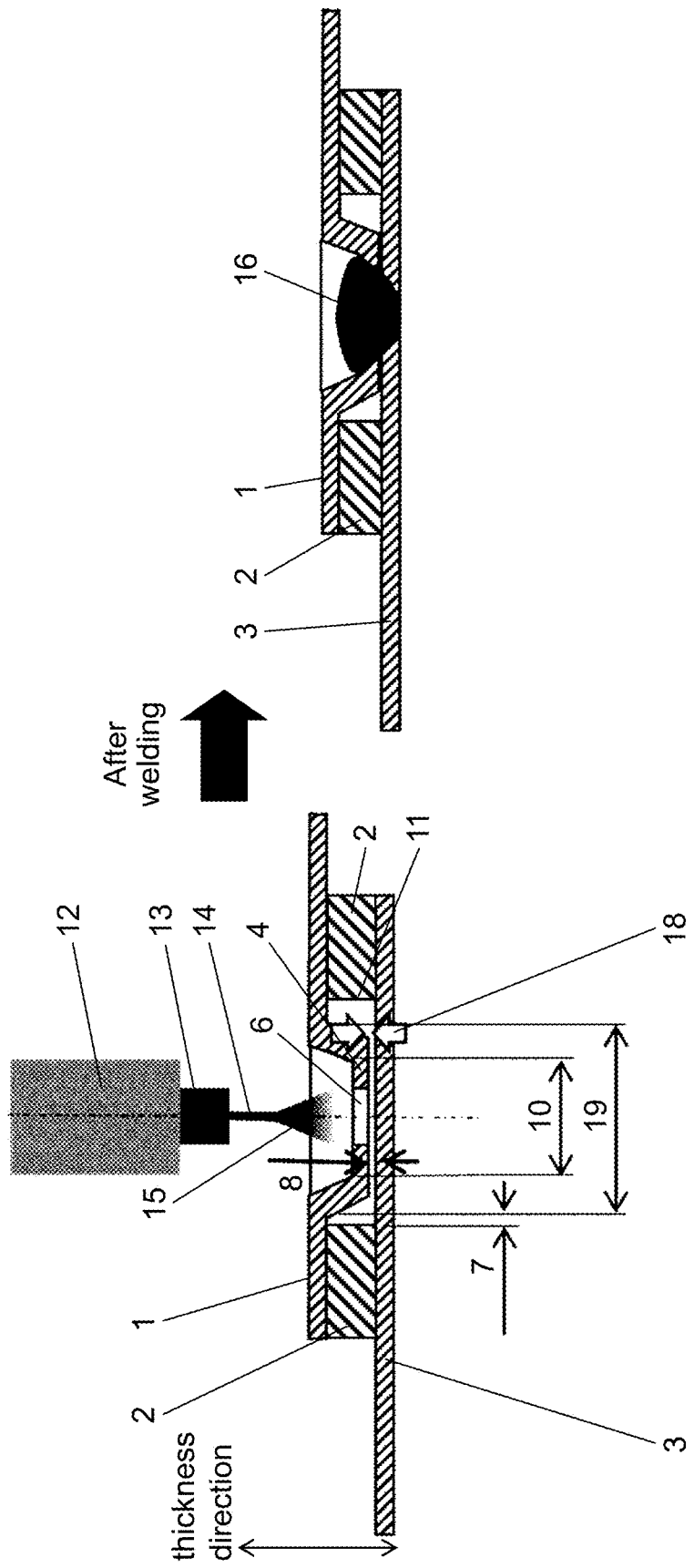
FIG. 11 is a schematic diagram of another joint structure during arc welding according to the third exemplary embodiment of the present disclosure.
Figure 12:
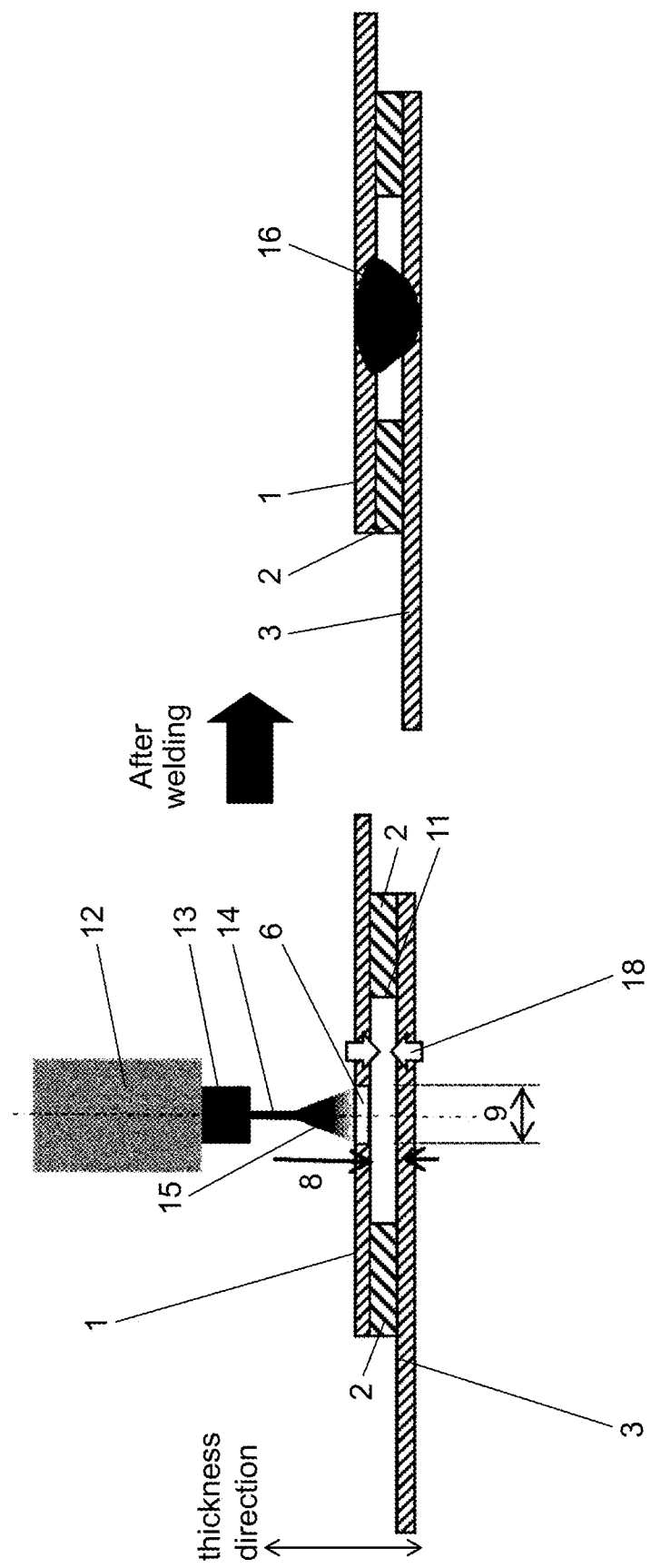
FIG. 12 is a schematic diagram of another joint structure during arc welding according to the third exemplary embodiment of the present disclosure.

When first projection 4 of first material 1 has second through-hole 6 at its center, third material 3 does not necessarily have second projection 5 as shown in FIG. 11, unlike the first exemplary embodiment. Alternatively, neither of first and third materials 1 and 3 may have a projection as shown in FIG. 12.

Fourth Exemplary Embodiment

Figure 13:
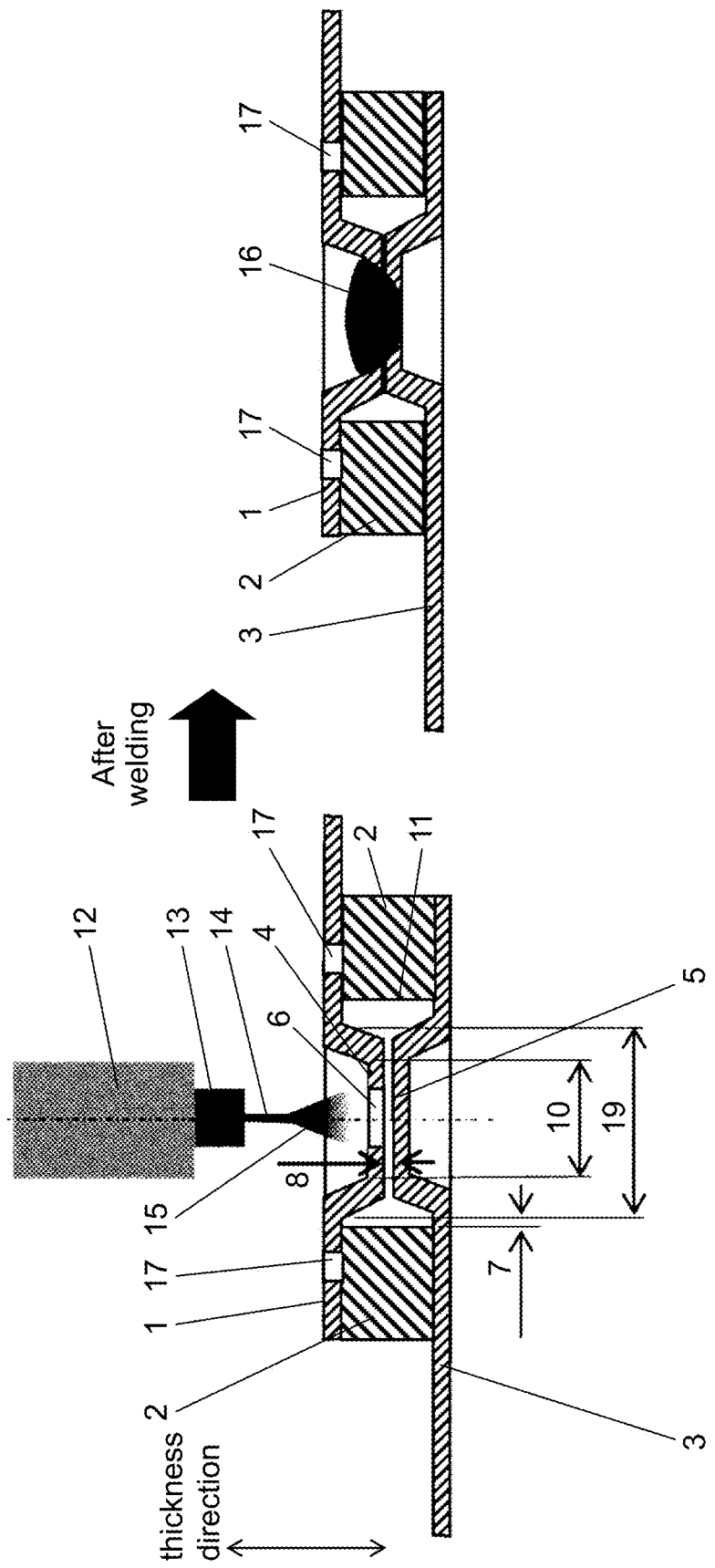
FIG. 13 is a schematic diagram of a joint structure during arc welding according to a fourth exemplary embodiment of the present disclosure.

A fourth exemplary embodiment will now be described with reference to FIG. 13. The same configuration as in the first exemplary embodiment will not be described again. The fourth exemplary embodiment differs from the first exemplary embodiment in that a plurality of discharge holes 17 or discharge grooves are formed, which penetrate either first material 1 or third material 3 in the thickness direction. Discharge holes 17 or discharge grooves are provided outside the region where projections 4 and 5 are in contact with each other in the direction perpendicular to the thickness direction. In other words, discharge holes 17 or discharge grooves are provided outside first through-hole 11 in the direction perpendicular to the thickness direction. Discharge holes 17 and discharge grooves are examples of the discharge opening of the present disclosure.

Assume that second material 2 is resin low in the melting and boiling points. In this case, second material 2 is likely to be melted by a welding heat input and to flow into weld 16 and vaporize, possibly generating welding holes or other defectiveness. To avoid this happening, discharge holes 17 can be formed in at least one of the similar types of metallic materials which sandwich and fix the different type of material in between. In this case, discharge holes 17 can prevent the molten part of second material 2 from flowing into weld 16 while arc 15 is being applied to it, and accelerates the discharge of the molten part to the outside.

Discharge holes 17 are provided in third material 3 in the present exemplary embodiment, but may alternatively be provided in first material 1 or in both first and third materials 1 and 3. Still alternatively, the discharge holes may be replaced by, for example, long discharge grooves.

Conclusion

Conventional rivets for joining different types of materials together have complicated shapes such as an R-chamfered part or an annular groove for the following objectives; to create a space to accommodate the part of the different type of material that is deformed during crimping and spot welding; and to prevent misalignment of the electrode during spot welding, and hence, to prevent depression of the different type of material so as to maintain the joint strength.

These objectives can be achieved by using rivets with a complicated shape. Such rivets can be fabricated by high precision processing technology, thus increasing the production cost. Furthermore, spot welding has low throughput because it involves time-consuming processes, such as pressurization, energization, cooling, and transfer. Moreover, the joint members are sandwiched from both sides, which indicates a low degree of design freedom. Adjacent rivets too close to each other can cause current diversion during spot welding. This would result in insufficient formation of a nugget, which is a part welded and solidified in the resistance welding. A desired nugget without current diversion can be formed by setting the pitch between adjacent rivets at not less than the minimum pitch. Therefore, rivets cannot be arranged at a pitch not more than the minimum pitch, making it impossible to improve joint stiffness at required positions. The present disclosure can solve these conventional problems.

As described hereinbefore, the joint structure of some exemplary embodiment includes, a first metallic material having first projection 4; a second metallic material similar in type to the first metallic material and weldable to the first metallic material; and a different type of material different in type from the first metallic material and the second metallic material, the different type of material having first through-hole 11 and sandwiched between the first metallic material and the second metallic material, the different type of material being difficult to be welded to the first metallic material and the second metallic material. First projection 4 is smaller in diameter or width than first through-hole 11 and is spaced radially or widthwise from the rim of first through-hole 11 by first gap 7. First projection 4 is positioned in first through-hole 11 and is spaced from the second metallic material by a second gap 8 in the thickness direction of first through-hole 11. Second gap 8 has a size of the predetermined percentage of the thickness of first projection 4 of the first metallic material to which arc in arc welding is applied.

With this configuration, arc starts to be applied to the region to be irradiated when the second gap is still present. As a result, the first metallic material and the second metallic material are melted and joined together inside first through-hole 11 to compress and fix the different type of material. Thus, the different type of material, the first metallic material, and the second metallic material are fixed together.

This joint structure eliminates the need to use complicated parts that are fabricated by high precision processing technology. As another advantage, the use of arc welding instead of spot welding reduces the operating time including welding time to about 25% of spot welding, thereby greatly improving the throughput. Another advantage is to increase the stiffness at required positions and the degree of design freedom of joint members.

First projection 4 may be formed on the surface of the first metallic material that opposes the second metallic material when the first metallic material and the second metallic material sandwich the different type of material via first through-hole 11.

The second metallic material may have second projection 5. Second projection 5 is formed on the surface of the second metallic material that opposes the first metallic material when the first metallic material and the second metallic material sandwich the different type of material via first through-hole 11 of the different type of material.

Part of the different type of material that is around first through-hole 11 may melt, flow, and be tightly fixed to the outer periphery of first projection 4.

The weld region to be arc welded in the thickness direction may be smaller in diameter or width than first projection 4 by a predetermined distance.

First projection 4 may have second through-hole 6 so as to have the shape of a flange with a central hole, second through-hole 6 being in the weld region to be arc welded in the thickness direction.

At least one of the first metallic material and the second metallic material sandwiching the different type of material in between may have discharge holes 17 penetrating in the thickness direction, discharge holes 17 being located in a position corresponding to the outside of first through-hole 11 of the different type of material.

The arc welding may be one of the following types of welding: arc welding with a consumable electrode, TIG welding with a non-consumable electrode, and plasma welding with a non-consumable electrode.

INDUSTRIAL APPLICABILITY

The joint structure of the present disclosure is simple and can greatly reduce the production cycle time and increase stiffness at required positions when different types of materials are joined together. This joint structure, which can increase the degree of design freedom of joint members, is industrially applicable.

REFERENCE MARKS IN THE DRAWINGS 1 first material (first metallic material)
2 second material (different type of material)
3 third material (second metallic material)
4 first projection
5 second projection
6 second through-hole (second penetrating part)
7 first gap
8 second gap
9 second through-hole diameter
10 inner edge region of projections
11 first through-hole (first penetrating part)
12 nozzle
13 tip
14 welding wire
15 arc
16, 16a weld
17 discharge hole (discharge opening)
18 compressive force
19 outer edge region of projections

The invention claimed is:

1. An arc welding method comprising:
placing a middle plate in contact with and between an upper plate and a lower plate that are made of metals weldable to each other,
the upper plate has an upper plate projection extending from a lower surface of the upper plate,
the lower plate has a lower plate projection extending from an upper surface of the lower plate,
wherein the middle plate has a penetrating part and the middle plate is difficult to weld to the upper plate and the lower plate, a material of the middle plate being different from the upper plate and the lower plate,
in the placing the middle plate in contact with and between the upper plate and the lower plate, an upper-lower plate gap is formed between a lower surface of the upper plate projection and an upper surface of the lower plate projection, the upper-lower plate gap corresponding to a region in the penetrating part, and
the arc welding method further comprises, after the placing of the middle plate in contact with and between the upper plate and the lower plate, applying an arc on an upper side of the upper plate projection disposed toward the region corresponding to the penetrating part, so that the upper plate projection and the lower plate projection are fused and bonded together via the penetrating part, by which the middle plate is compressed between the upper plate and the lower plate and is fixed to the upper plate and the lower plate by welding the upper-lower plate gap, and
the upper-lower plate gap being configured to prevent a defective weld by having a size that varies within a specific range depending on a thickness of the upper plate on an arc-incident side,
wherein the middle plate includes a resin material,
wherein in the placing the middle plate in contact with and between the upper plate and the lower plate, a middle plate gap is configured between a rim of the penetrating part and an outermost edge of the upper plate projection and between the rim of the penetrating part and an outermost edge of the lower plate projection, the middle plate gap being configured to prevent a defective weld by having a size that varies depending on a thickness and material-type of the middle plate, and wherein the middle plate gap is configured between an uppermost portion of the rim of the penetrating part and the outermost edge of the upper plate projection and between a lowermost portion of the rim of the penetrating part and the outermost edge of the lower plate projection.

2. The arc welding method according to claim 1, wherein the upper-lower plate gap is within 4% to 61% of a thickness of the upper plate under the condition that the upper plate projection and the lower plate projection are mild steel.

3. The arc welding method according to claim 1, wherein
the upper-lower plate gap is within 4% (0.1 mm) to 61% (1.4 mm) of a thickness of the upper plate projection under a condition of,
the thickness of the upper plate projection is 2.3 mm,
the upper plate projection and the lower plate projection are both mild steel,
the middle plate is PET,
metal active gas (MAG) arc welding is applied at an output current of 100 A to 250 A for 0.3 seconds,
an inner edge region of the upper plate projection and the lower plate projection is an area with a diameter of φ 10 mm,
the penetrating part of middle plate has a diameter of φ 12 mm, and
a spot diameter of a region to be irradiated is φ 8 mm.

4. The arc welding method according to claim 1, wherein
the upper-lower plate gap is within 6% (0.1 mm) to 63% (1.0 mm) of a thickness of the upper plate projection under a condition of,
the thickness of the upper plate projection is 1.6 mm,
the upper plate projection and the lower plate projection are both mild steel,
the middle plate is PET,
metal active gas (MAG) arc welding is applied at an output current of 100 A to 250 A for 0.3 seconds,
an inner edge region of the upper plate projection and the lower plate projection is an area with a diameter of φ 10 mm,
the penetrating part of middle plate has a diameter of φ 12 mm, and
a spot diameter of a region to be irradiated is φ 8 mm.

5. The arc welding method according to claim 1, wherein
the upper-lower plate gap is within 8% (0.1 mm) to 67% (0.8 mm) of a thickness of the upper plate projection under a condition of,
the thickness of the upper plate projection is 1.2 mm,
the upper plate projection and the lower plate projection are both mild steel,
the middle plate is PET,
metal active gas (MAG) arc welding is applied at an output current of 100 A to 250 A for 0.3 seconds,
an inner edge region of the upper plate projection and the lower plate projection is an area with a diameter of φ 10 mm,
the penetrating part of middle plate has a diameter of φ 12 mm, and
a spot diameter of a region to be irradiated is φ 8 mm.

6. The arc welding method according to claim 1, wherein
the upper-lower plate gap is within 13% (0.1 mm) to 75% (0.6 mm) of a thickness of the upper plate projection under a condition of,
the thickness of the upper plate projection is 0.8 mm,
the upper plate projection and the lower plate projection are both mild steel,
the middle plate is PET,
metal active gas (MAG) arc welding is applied at an output current of 100 A to 250 A for 0.3 seconds,
an inner edge region of the upper plate projection and the lower plate projection is an area with a diameter of φ 10 mm,
the penetrating part of middle plate has a diameter of φ 12 mm, and
a spot diameter of a region to be irradiated is φ 8 mm.

7. The arc welding method according to claim 1, wherein in the placing the middle plate in contact with and between the upper plate and the lower plate, the middle plate is in contact with the lower surface of the upper plate and the upper surface of the lower plate.

8. The arc welding method according to claim 1, wherein the resin material is PET and the middle plate gap is at least 40% or more of the thickness of the middle plate.

9. The arc welding method according to claim 1, wherein the resin material is a carbon fiber reinforced plastic (CFRP) and the middle plate gap is at least 30% or more of the thickness of the middle plate.

10. An arc welding method comprising:
placing a middle plate in contact with and between an upper plate and a lower plate that are made of metals weldable to each other,
the upper plate has an upper plate projection extending from a lower surface of the upper plate,
the lower plate has a lower plate projection extending from an upper surface of the lower plate,
wherein the middle plate has a penetrating part and the middle plate is difficult to weld to the upper plate and the lower plate, a material of the middle plate being different from the upper plate and the lower plate,
in the placing the middle plate in contact with and between the upper plate and the lower plate, an upper-lower plate gap is formed between a lower surface of the upper plate projection and an upper surface of the lower plate projection, the upper-lower plate gap corresponding to a region in the penetrating part, and
the arc welding method further comprises, after the placing of the middle plate in contact with and between the upper plate and the lower plate, applying an arc on an upper side of the upper plate projection disposed toward the region corresponding to the penetrating part, so that the upper plate projection and the lower plate projection are fused and bonded together via the penetrating part, by which the middle plate is compressed between the upper plate and the lower plate and is fixed to the upper plate and the lower plate by welding the upper-lower plate gap,
the upper-lower plate gap being configured to prevent a defective weld by having a size that varies within a specific range depending on a thickness of the upper plate on an arc-incident side,
wherein in the placing the middle plate in contact with and between the upper plate and the lower plate, a middle plate gap is configured between a rim of the penetrating part and an outermost edge of the upper plate projection and between the rim of the penetrating part and an outermost edge of the lower plate projection, the middle plate gap being configured to prevent a defective weld by having a size that varies depending on a thickness and material-type of the middle plate, and
wherein the middle plate gap is configured between an uppermost portion of the rim of the penetrating part and the outermost edge of the upper plate projection and between a lowermost portion of the rim of the penetrating part and the outermost edge of the lower plate projection.

\* \* \* \* \*